United States Patent [19]
Hahn

[11] Patent Number: 5,305,085
[45] Date of Patent: Apr. 19, 1994

[54] RADIO FREQUENCY EXCITED RING LASER GYROSCOPE WITH COMMON INDUCTION COIL

[75] Inventor: Tae W. Hahn, Chatsworth, Calif.

[73] Assignee: Litton Systems, Inc., Woodland Hills, Calif.

[21] Appl. No.: 253,094

[22] Filed: Sep. 22, 1988

[51] Int. Cl.⁵ .................... G01B 9/02; H01S 3/083
[52] U.S. Cl. .................... 356/350; 372/37; 372/82; 372/83; 372/94
[58] Field of Search ............ 356/350; 372/37, 82, 372/83, 94

[56] References Cited

U.S. PATENT DOCUMENTS

| | | | |
|---|---|---|---|
| 3,800,244 | 3/1974 | Karras | 372/82 X |
| 4,031,428 | 6/1977 | Tokudome et al. | 372/88 X |
| 4,114,114 | 9/1978 | Pressley et al. | 372/83 X |
| 4,482,249 | 11/1984 | Smith, Jr. et al. | 356/350 |
| 4,522,496 | 6/1985 | Sanders | 356/350 |
| 4,578,793 | 3/1986 | Kane et al. | 356/350 X |
| 4,747,111 | 5/1988 | Trutna, Jr. et al. | 372/37 X |
| 4,813,774 | 3/1989 | Dorschner et al. | 356/350 X |

OTHER PUBLICATIONS

U.S. patent application Ser. No. 115,018, dated Oct. 1987, Martin.
U.S. patent application Ser. No. 218,405, dated Jun. 1988, Hahn et al.
"Multioscillator Laser Gyros", *IEEE Journal of Quantum Electronics*, pp. 918-936, by Weng W. Chow, et al., No. 9, Sep. 1980.

*Primary Examiner*—Stephen C. Buczinski
*Attorney, Agent, or Firm*—L. David Rish; M. Michael Carpenter

[57] ABSTRACT

A split gain multi-mode ring laser gyroscope is disclosed having a radio frequency excitation induction coil which also serves the magnetic mode suppression system, suppressing undesirable modes of the gain curve to achieve the split gain effect. The induction coil serves as an important common component of both the gain medium excitation and mode suppression systems. The induction coil is suitably configured to carry both AC and DC signals.

7 Claims, 2 Drawing Sheets

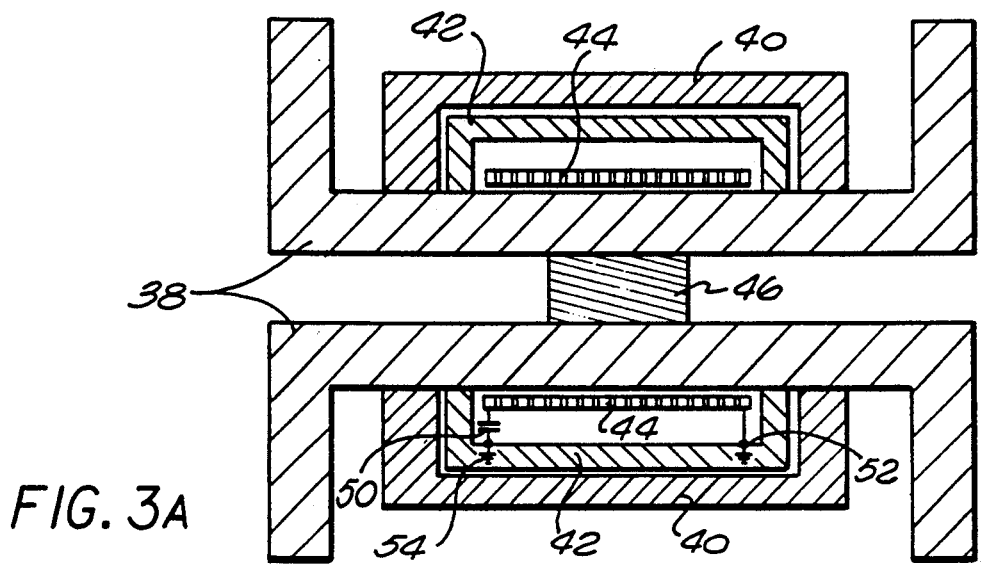
FIG. 3A
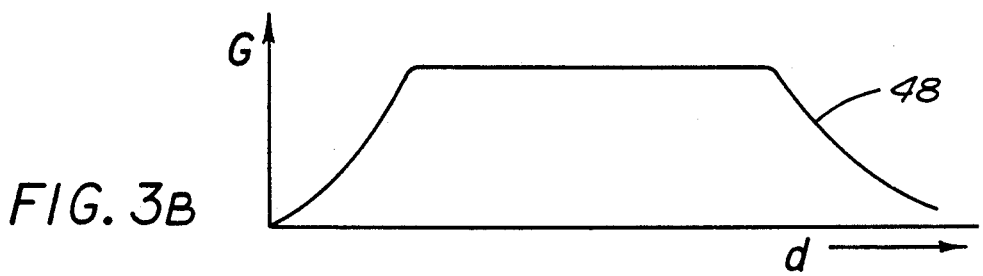
FIG. 3B
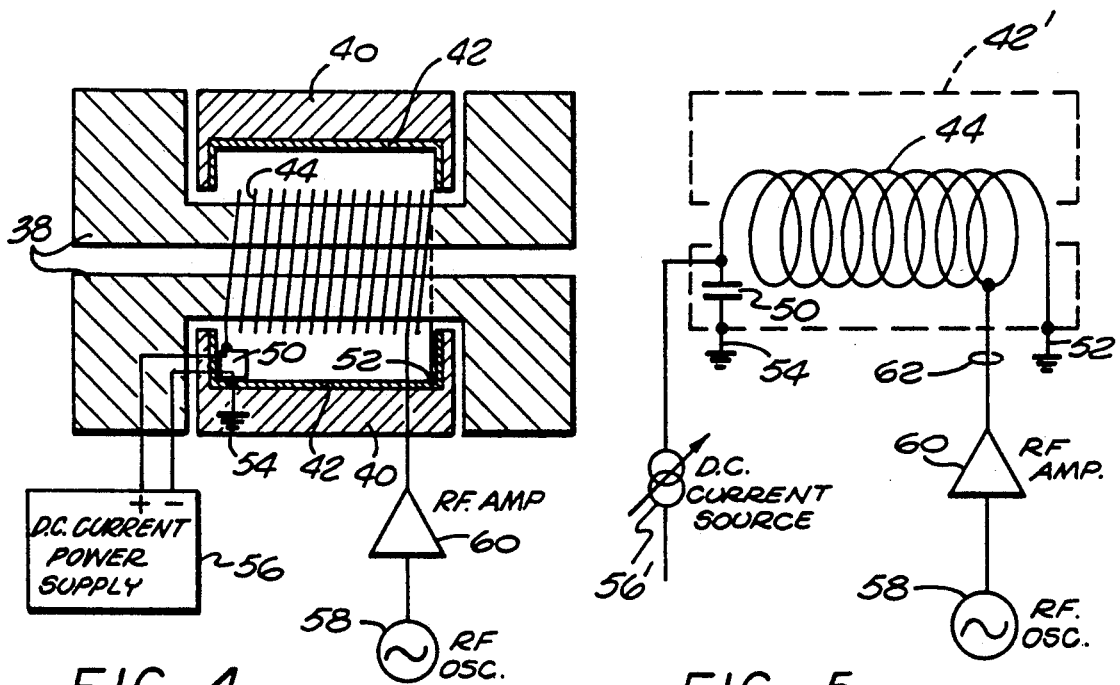
FIG. 4
FIG. 5

RADIO FREQUENCY EXCITED RING LASER GYROSCOPE WITH COMMON INDUCTION COIL

BACKGROUND OF THE INVENTION

1. Field of the Invention

This invention relates to optical rotation sensors; and, particularly, this invention relates to a split gain multimode ring laser gyroscope, having an active medium gain which is radio frequency excited, where a common helical resonator coil is used to perform gain medium excitation and mode suppression functions.

2. Description of the Related Art

Ring laser gyroscopes are an alternative form of rotation sensors which do not require the use of a spinning mass characteristic of a mechanical gyroscope. A ring laser gyroscope employs a Sagnac effect to detect rotation optically, as an alternative to the inertial principles upon which a mechanical gyroscope operates.

The earlies developed ring laser gyroscopes have two independent counter-rotating light beams or other electromagnetic propogation which travel within an optical ring cavity. These two light beams propogate in a closed loop with transit times that differ ideally in direct proportion to the rotation rate of the loop about an axis perpendicular to the plane of the loop. Planar gyros are usually driven by a DC discharge power source where an active gas medium within the cavity is excited between a cathode and at least two anodes. In certain ranges of current operation, instabilities in the current and voltage discharges arise. Planar ring laser gyroscopes must be substantially symmetrical to counteract the potential for false reading due to the electrophoretic process known as Langmuir flow.

An additional and more serious cause of inaccuracies in rotational sensing of a two-mode planar ring laser gyroscope is the phenomenon known as frequency lock or mode locking. Mode locking is a major difficulty at low rotation rates where the ring laser gyroscope produces a false indication that the device is not rotating. If the rotation rate of a ring laser gyroscope starts at a value above that of where lock-in occurs, and is then decreased, the frequency difference between the beams disappears at a certain input rotation. This input rotation rate is called the lock-in threshold. The range of rotation rates over which lock-in occurs is generally called the dead band of the ring laser gyroscope. Lock-in arises from the coupling of light between the beams. Today, the only means of overcoming the lock-in effect of the counter-propagating modes of light within a two mode gyroscope is to mechanically dither the mirrors or body of the gyroscope. A more detailed explanation of the problems associated with a planar two mode gyroscope are described in *Laser Applications*, edited by Monte Ross, Pages 133-200 (Academic Press, 1971).

Since one of the primary benefits of a ring laser gyroscope is that it overcame the need for mechanical or moving parts, a body dithered planar two mode gyroscope does not truly meet this goal. In an effort to achieve a fully optical ring laser gyroscope, the non-planar multi-mode ring laser gyroscope was developed to overcome the effects of mode locking without the need to dither. The term (multioscillator) refers to four modes of electromagnetic energy that propagates simultaneously in the cavity as opposed to the usual pair counter-propagating linearly polarized modes that exist in the conventional two mode gyroscope. A detailed discussion of the operation of the multi-oscillator laser gyroscope is presented in the article Chow, et. al., at pages 918-936, IEEE Journal of Quantum Electronics, Vol. QE-16, No. 9, September 1980.

Briefly, the basic multi-oscillator ring laser gyroscope operates with left circularly polarized (LCP) and right circularly polarized (RCP) light beams and uses a Faraday effect glass device within the cavity or magnetic field on the gain plasma to provide a phase shift between the counter propagating waves to prevent mode locking. Reflections and backscatter from the intra-cavity element and instabilities of the magnetic field associated therewith cause difficulties that need to be overcome in order to build a fully optical navigational grade multi-oscillator ring laser gyroscope.

An important attempt to overcome the problems presented by the multioscillator ring laser gyroscope is the split gain multimode ring laser gyroscope as disclosed and claimed in U.S. patent application Ser. No. 07/115,018, filed Oct. 28, 1987 (placed under Secrecy Order on May 17, 1988). The split gain multimode ring laser gyroscope is directed to an non-planar multimode ring laser gyroscope, having no intra-cavity element. The split gain gyroscope includes the step of adjusting an axially applied magnetic field to a magnitude that produces a splitting between the gain curve for anti-clockwise left circularly polarized light (La) and clockwise right circularly polarized light (Rc) and the gain curve for clockwise left circularly polarized light (Lc) and anti-clockwise right polarized light (Ra) that is substantially equal in frequency to a multiple of the free spectral range of the cavity. By providing an axially directed magnetic field to the gain medium, the lasing action of selected modes of the cavity is suppressed by means of frequency shifting the gain curve centers, preventing frequency locking. While originally designed for use with a DC discharge mechanism (for exciting the active gain medium), an RF excited gain medium would provide a most desirable design.

As taught in U.S. patent application Ser. No. 07/115,018 (assigned to common assignee of this application), radio frequency discharges may be used to excite the gain medium of a split gain gyroscope. The split gain gyroscope also requires that where a permanent magnet is used to provide an axial magnetic field, a DC helical coil is also needed in order to fine tune the magnetic field to properly split the gain curves within this multimode ring laser gyroscope. In particular, FIG. 15 of U.S. application Ser. No. 07/115,018 discloses a configuration for achieving radio frequency excitation of a split gain multimode ring laser gyroscope.

The design described in FIG. 15 of the Ser. No. 07/115,018 U.S. Patent Application is reproduced as FIG. 1A of this application. With reference to the prior art figure 1A in this application, it will be noted that a gyro frame 12, along one of its frame legs supports a gain medium excitation resonator helical coil 20, which is wrapped around the frame leg of the gyro frame 12. Surrounding the helical 20 is resonator shield 18, which may be a cylindrical copper tube open at each end only enough to accommodate positioning along the frame leg of the gyroscope frame 12. Immediately surrounding and enclosing a resonator shield 18 are DC field windings 16 used to fine tune the axial magnetic field, applied by the permanent magnetic 14 to the active gain medium 22. It can be seen that this design (FIG. 1A) is rather complicated and requires two separate coils, one to carry a DC signal (16) and another coil to carry the AC excitation signal (20).

With reference to FIG. 1B, it will also be noted that the axial magnetic field produced has low gradient characteristics (the flat portion of curve 24 of FIG. 1B) over an axial distance that is less than the axial length of the gain medium 22. It has recently been discovered that low gradient throughout the gain medium 22 is desirable in order to reduce thermal bias effects. Also, the split gain effect is enhanced when the magnetic field is provided uniformly across the active gain medium 22 region. The design shown in FIG. 1A does not easily accomplish the task of providing a low gradient magnetic field through the gain medium 22. Since the split gain multimode ring laser gyroscope operates best when the active medium is contained within the permanent magnet 14, the radio frequency excitation mechanism shown and described in FIG. 1A (and U.S. patent application Ser. No. 07/115,018) does not present a design showing a magnetic field which is truly uniform throughout the entire extent of the gain medium 22. Also, this prior art design (FIG. 1A) is too cumbersome to easily manufacture.

SUMMARY OF THE INVENTION

What is needed is a radio frequency excited split gain multimode ring laser gyroscope that provides an optimum gain excitation and mode suppression design. Disclosed herein is a split gain multimode ring laser gyroscope, which includes a monolithic frame having a closed cavity therethrough. The cavity defines an nonplanar configured closed optical pathway formed between a plurality of mirrors affixed to the frame. This ring laser gyroscope includes a source (within the active gain medium) contained within the closed optical path for producing at least four modes of electromagnetic radiation through excitation of the gain medium of the cavity. The multimode ring laser gyroscope of this invention also includes a mode suppression mechanism for suppresing the lasing action of selected modes of radiation within the cavity. Induction means are included which provide both DC and AC signals to the mode suppression means and the gain medium excitation means, respectively; such that, the induction means is an element common to both the mode suppression and gain medium excitation mechanisms. In this manner, mode suppression and gain medium excitation are accomplished through an optimized and simplified design. Furthermore, the induction may be used to position the gain medium centered within the magnetic field produced by the mode suppression means, this field being characterized by a long distance range low gradient effect.

The induction means that is common to both mode suppression and gain excitation mechanisms is a helical coil that is grounded. This helical coil is enclosed within a resonator shield and is an element that is common to both the mode suppression and gain excitation systems within the ring laser gyroscope.

The gain medium excitation system of this ring laser gyroscope includes a radio frequency oscillator, which is coupled to a radio frequency amplifier. The amplifier is then coupled to an induction means. The induction means is coupled directly to an AC ground by way of a capacitor. In this manner an RF signal is provided to the gain medium for excitation of the atoms of the medium to energy levels sufficient to commence lasing. This same helical coil also serves as a significant element of the mode suppression system. The mode suppression system includes a DC current source which is coupled to the induction means. A capacitor is coupled to the induction means and interposed between ground and the induction means. In this method, the mode suppression means acts on the excited gain medium uniformly along its entire extent and is provided by the same helical coil which is used to excite the active gain medium.

The advantages set forth will become more apparent from a review of the accompanying drawings and the detailed description of the preferred embodiment of this invention which follows.

BRIEF DESCRIPTION OF THE DRAWINGS

FIG. 3A shows a cross sectional view taken along the frame leg 38 of the multimode split gain ring laser gyroscope of FIG. 2, showing the construction and configuration of the gain excitation and mode suppression systems of this invention.

FIG. 3B is a graphic representation of the magnetic flux distribution along the axial length of the frame leg 38 of FIG. 3A, illustrating the low gradient magnetic field provided by the configuration development shown in FIG. 3A.

FIG. 4 is an electromechanical schematic showing the configuration of the gain excitation and mode suppression systems as taught in this invention.

FIG. 5 shows an electrical schematic of the electronic elements as they are configured within the split gain multimode ring laser of this invention.

DETAILED DESCRIPTION OF THE PREFERRED EMBODIMENT

Figure 2:
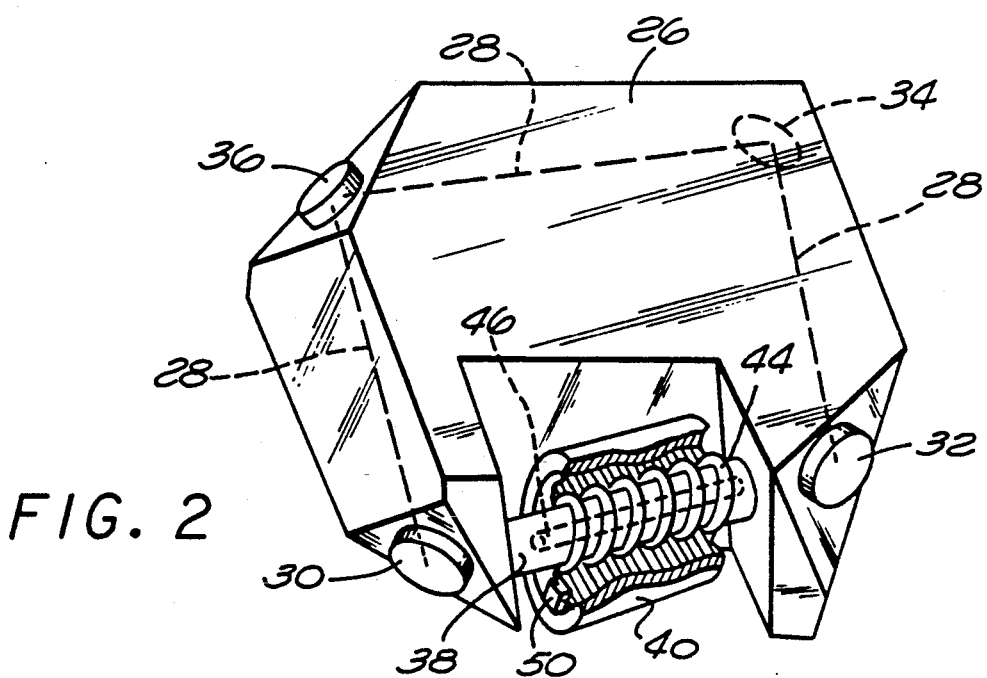
FIG. 2 is a perspective view of a multioscillator ring laser gyroscope showing, in partial section, the configuration of the radio frequency excitation mechanism used by a split gain multimode ring laser gyroscope in accordance with this invention.

FIG. 2 shows a split gain multimode ring laser gyroscope made in accordance with the teachings of this invention. The monolithic frame 26 is made from a dielectric material at a low coefficient of thermal expansion. The split gain multimode ring laser gyroscope is configured in an non-planar geometry. A strong permanent magnet 40 is used to cause the split gain effect needed to operate this form of ring laser gyroscope. It will be noted that an optical pathway 28 is defined between mirrors 30, 32, 34, and 36. Particularly between 30 and 32, a frame leg 38 is carved from the monolithic frame 26 and supports the helical resonator coil 44. The coil 44 and frame leg 38 are surrounded by a permanent magnet 40. Operation of the helical coil 44 within a resonator shield 42 (FIG. 3A) at full wave operation provides a gain medium 46 which is centered within the permanent magnet 40 and confined to the frame leg 38 between the mirrors 30 and 32. (A detailed discussion of this form of split gain multimode ring laser gyroscope is presented in co-pending U.S. patent application Ser. No. 07/218,405 which was filed Jun. 22, 1988, with Group 220, in the Licensing and Review Section of the United States Patent and Trademark Office).

With reference to FIGS. 3A, 3B and 4, a cross-sectional view of frame leg 38 is provided showing the construction of the mode suppression and gain excitation systems of this split gain multimode ring laser gyroscope. The frame leg 38 defines a portion of the gain cavity bore between mirror 30 and 32 (FIG. 2). The gain medium 46 is confined within the frame leg 38. A single helical coil 44 is wound around the frame leg 38. One end of the coil is grounded to the resonator shield 42 at 52. Additionally, this coil 44 is grounded through the capacitor 50 to the resonator shield 42 at 54. A DC current power supply 56 is connected to the capacitor 50 as shown in FIG. 4. One plate of the capacitor 50 is grounded at 54, while the other plate of capacitor 50 connects the DC current power supply 56 to the helical coil 44 for the introduction of a DC signal onto the coil 44. This DC signal is used to fine tune the magnetic field that is produced by the permanent magnet 40.

An AC radio frequency (RF) signal which is used to excite the gain medium 46 is also imparted onto the induction coil 44. The radio frequency signal used to excite the gain medium 44 is provided by an RF oscillator 58, which is connected to an RF amplifier 60. The RF amplifier 60 boosts the output signal from the RF oscillator 58 and provides an output AC signal to the helical coil 44. The amplified output signal from the radio frequency amplifier 60 travels through the coil 44 and resonates within the resonant cavity within the resonator shield 42. As the radio frequency signal produced by the RF oscillator 58 (and amplified by the RF amplifier 60) resonates within the shield 42, the gain medium 46 is both centered within the central bore defined within the frame leg 38 and also excited by this AC signal.

Thus a single induction means is used which includes the helical coil 44 as a common element for use in providing the gain medium 46 with a DC mode suppression signal and a AC gain medium excitation signal. By having only one coil 44, a longer region of low gradient magnetic field is achieved, as shown by the gain curve 48 of FIG. 3B.

Figure 1A:
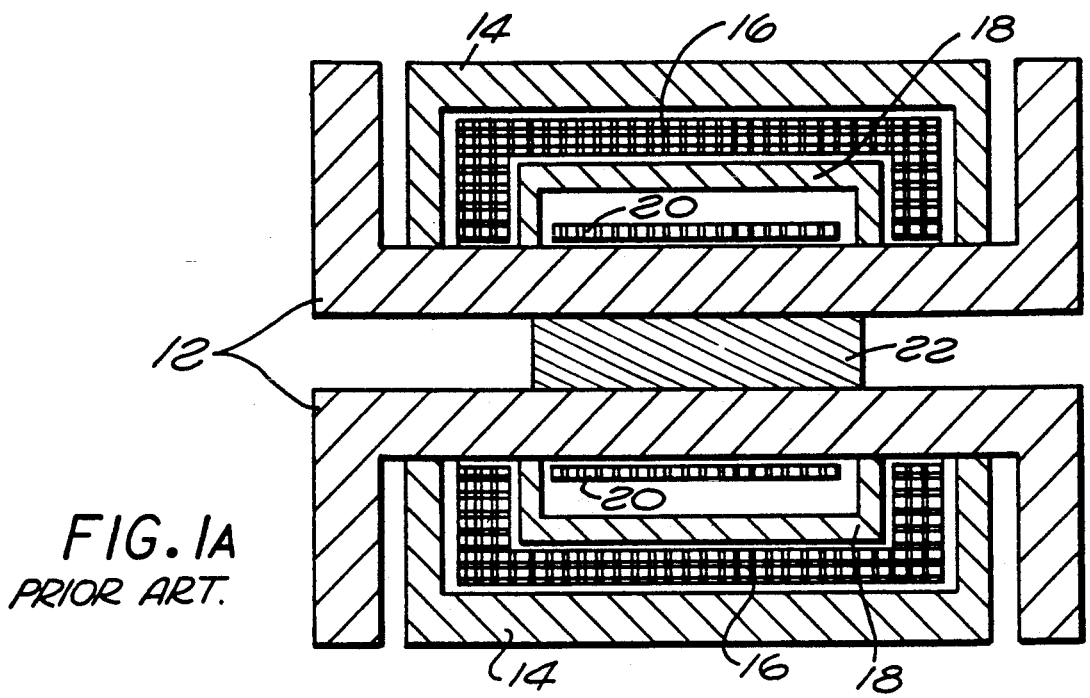
FIG. 1A shows a cross sectional view of the Prior Art configuration for an RF excited split gain multimode ring laser gyroscope system.
Figure 1B:
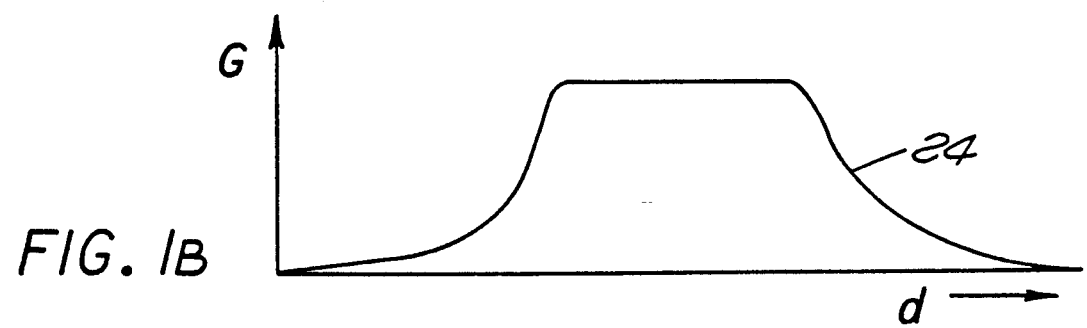
FIG. 1B shows a gain curve plotting magnetic flux against distance characteristic of the magnetic field provided to the gain medium 22 of FIG. 1A.

It will be noted that both FIGS. 2B and 3B plot magnetic flux (G or gauss) against distance. Since the DC coil 16 of FIG. 1A is outside the resonator shield and of a substantially greater diameter than the AC helical coil 20 of FIG. 1A, the low gradient characteristic of the gain curve 24 does not extend throughout the entire length of the gain medium 22 in the Prior Art. This is contrasted with the magnetic field profile shown in FIG. 3B (resulting from the configuration of the mode suppression system of FIG. 3A) taught in this application. Because a single helical coil 44 performs both AC excitation and DC mode suppression functions, the DC mode suppression function is carried out uniformly across the entire length of the gain medium 46 within the central bore of the frame leg 38. This in contrast to the prior art design and represents an important improvement over the prior art shown in FIGS. 1A and 1B. Additionally, the disclosed invention is directed to an optimized and simplified construction over that shown in the prior art in FIG. 1A.

FIG. 5 shows an electrical schematic which illustrates the operation of the mode suppression and gain excitation systems of this invention. (For ease of illustration, the permanent magnet 40 which surrounds the resonator shield 42' is not shown.) As clearly illustrated, the helical coil 44 is common to both the mode suppression system and the gain excitation system of this invention. A DC current source 56' provides the DC signal which is directed to ground through the helical coil 44 and grounded at 52. Imparted on the same helical coil 44 is a radio frequency AC signal, initially generated at the RF oscillator 58. This radio frequency signal is then amplified and boosted by the RF amplifier 60, which is connected to the helical coil 44 through coaxial cable 62 to prevent contact with the resonator shield 42'. After oscillating through the entire coil 44, the AC signal exits the helical coil 44 by way of the AC ground through the capacitor 50 at ground position 54. In this manner, a mode suppression and gain excitation system is provided which uses an induction means (in the form of a helical coil 44) as an element common to both the gain medium exicitation and mode suppression systems.

While a preferred embodiment of the radio frequency excitation system with a common induction element for the split gain multimode ring laser gyroscope of this invention has been shown, it is clear that alternative electronic configurations may be used. Any form of induction may provide a common element useful to both mode supression and gain medium excitation. While preferred embodiment has been shown, alternate equivalent embodiments are intended to be covered in the appended claims which follow this disclosure.

What is claimed is:

1. A split gain multi-mode ring laser gyroscope, including a monolithic frame having a closed cavity therethrough, said cavity defining a non-planar configured closed optical pathway formed between each two of a plurality of mirrors affixed to said frame, said ring laser gyroscope comprising:
    means for producing at least four modes of electromagnetic radiation by excitation of a gain medium within said cavity;
    mode suppression means for suppressing any lasing action of selected modes of radiation within said cavity;
    means for providing DC and AC signals by electromagnetic induction to said mode suppression means and said means for producing electromagnetic radiation by gain medium excitation, respectively, said induction means being common to both said mode suppression and gain medium excitation means;
    whereby, both mode suppression and gain medium excitation may be accomplished through a common device.

2. The split gain multi-mode ring laser gyroscope of claim 1, wherein:
    said induction means is used to center said gain medium within a magnetic field produced by said mode suppression means.

3. The split gain multi-mode ring laser gyroscope of claim 2, wherein:
    said induction means is a helical coil grounded through a capacitor at one end;
    said helical coil being enclosed within a resonator shield.

4. The split gain multi-mode ring laser gyroscope of claim 3, wherein:
    said helical coil is grounded at a second end by connection directly to said resonator shield.

5. The split gain multimode ring laser gyroscope of claim 1, wherein:
    said gain medium excitation means includes:
    a radio frequency (RF) oscillator;

said oscillator coupled to a radio frequency (RF) amplifier;

said amplifier coupled to said induction means;

said induction means coupled directly to a ground;

whereby, a radio frequency (RF) signal is provided to said gain medium for excitation of the atoms of said medium to an energy level sufficient to commence lasing.

6. The split gain multi-mode ring laser gyroscope of claim 1, wherein:

said mode suppression means includes a DC current source, said DC current source coupled to said induction means;

whereby, the mode suppression means acts upon the excited gain medium uniformly along its entire extent.

7. A split gain multi-mode ring laser gyroscope, including a monolithic frame having a closed cavity therethrough, said cavity and a non-planar configured closed optical pathway formed between each two of a plurality of mirrors affixed to said frame, comprising:

a frame leg carved away from said monolithic frame, along a side of said frame which is positioned between two of said mirrors, said frame leg defining a portion of said closed cavity which encloses an active medium;

a single helical coil surrounding said frame leg, said coil suitably wired to carry both AC and DC signals;

a cylindrical resonator shield surrounding said coil, enclosing said coil about said frame leg at both ends of said coil;

a cylindrical permanent magnet surrounding said shield, mounted on said frame leg along the magnet's central axis, fully enclosing said shield and said coil;

whereby, a DC mode suppression signal and an RF gain medium excitation signal may be simultaneously imposed on said frame leg and said active gain medium within said leg; said DC mode suppression signal characterized by a particularly low gradient magnetic field which passes through the RF excited active gain medium as the medium is confined to said frame leg by the RF excitation signal.

* * * * *